United States Patent
Krasny et al.

(10) Patent No.: US 6,937,980 B2
(45) Date of Patent: Aug. 30, 2005

(54) SPEECH RECOGNITION USING MICROPHONE ANTENNA ARRAY

(75) Inventors: Leonid Krasny, Cary, NC (US); Ali Khayrallah, Apex, NC (US); Thomas Makovicka, Raleigh, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 575 days.

(21) Appl. No.: 09/970,369

(22) Filed: Oct. 2, 2001

(65) Prior Publication Data

US 2003/0069727 A1 Apr. 10, 2003

(51) Int. Cl.$^7$ .............................................. G10L 15/20
(52) U.S. Cl. ...................................... 704/231; 704/233
(58) Field of Search ............................... 704/231, 233, 704/270, 275

(56) References Cited

U.S. PATENT DOCUMENTS

| | | | | |
|---|---|---|---|---|
| 4,959,865 A | * | 9/1990 | Stettiner et al. | 704/233 |
| 5,033,082 A | * | 7/1991 | Eriksson et al. | 379/406.08 |
| 5,214,707 A | * | 5/1993 | Fujimoto et al. | 704/275 |
| 5,251,263 A | * | 10/1993 | Andrea et al. | 381/71.6 |
| 5,353,376 A | | 10/1994 | Oh et al. | |
| 5,574,824 A | * | 11/1996 | Slyh et al. | 704/226 |
| 6,192,134 B1 | * | 2/2001 | White et al. | 381/92 |
| 6,420,975 B1 | * | 7/2002 | DeLine et al. | 340/815.4 |
| 6,449,593 B1 | * | 9/2002 | Valve | 704/233 |
| 6,529,608 B2 | * | 3/2003 | Gersabeck et al. | 381/110 |
| 6,674,865 B1 | * | 1/2004 | Venkatesh et al. | 381/107 |

FOREIGN PATENT DOCUMENTS

EP  1081682  3/2001

OTHER PUBLICATIONS

Kiyohara K et al, "A Microphone Array System for Speech Recognition," Apr. 21, 1997 4 pages.
Van Compernolle D, "Switching Adaptive Filters for Enhancing Noisy and Reverberant Speech from Microphone Array Recordings," 4 pages.
Zhao Li et al, "Robust speech Coding Using Microphone Arrays," Nov. 2, 1997, 5 pages.

* cited by examiner

*Primary Examiner*—David L. Ometz
*Assistant Examiner*—Michael N. Opsasnick
(74) *Attorney, Agent, or Firm*—Coats & Bennett, P.L.L.C.

(57) ABSTRACT

A system and method of audio processing provides enhanced speech recognition. Audio input is received at a plurality of microphones. The multi-channel audio signal from the microphones may be processed by a beamforming network to generate a single-channel enhanced audio signal, on which voice activity is detected. Audio signals from the microphones are additionally processed by an adaptable noise cancellation filter having variable filter coefficients to generate a noise-suppressed audio signal. The variable filter coefficients are updated during periods of voice inactivity. A speech recognition engine may apply a speech recognition algorithm to the noise-suppressed audio signal and generate an appropriate output. The operation of the speech recognition engine and the adaptable noise cancellation filter may advantageously be controlled based on voice activity detected in the single-channel enhanced audio signal from the beamforming network.

11 Claims, 3 Drawing Sheets

SPEECH RECOGNITION USING MICROPHONE ANTENNA ARRAY

BACKGROUND OF THE INVENTION

The present invention relates generally to the field of audio processing and specifically to speech recognition using a microphone array.

As the popularity of wireless communications systems such as cellular telephones increases, many users utilize wireless mobile terminals in their automobiles. An increasingly popular trend is to equip mobile terminals with an external microphone and speaker, allowing for "hands-free" operation. In addition, it is known to include a speech recognition device in the hands-free adapter or the mobile terminal itself, so that the operator may, for example, "dial" a telephone number by voice command. While speech recognition technology is increasingly sophisticated, a clear separation of the voice component of an audio signal from noise components, i.e., a high Signal-to-Noise Ratio (SNR) is required for acceptable levels of accuracy in the speech recognition task. However, the movement of the microphone from adjacent the speaker's mouth, as in a hand-held unit, to a vehicle-mounted location, as in a hands-free unit, introduces significant noise into the audio input signal. Thus, a noise reduction operation must be performed on the audio signal prior to speech recognition to obtain satisfactory results.

Known audio noise reduction techniques, such as spectral subtraction, are deficient due to the frequency overlap between much motor vehicle cabin noise and the human speech spectrum. Additionally, frequency domain noise reduction techniques often introduce significant artifacts and aberrations into the speech audio component, making the speech recognition task more difficult.

SUMMARY OF THE INVENTION

The present invention comprises a method of audio processing which may advantageously be used in speech recognition. Audio input is received at a plurality of microphones (e.g., a "microphone array"). The multi-channel audio signal from the microphones may be processed by a beamforming network to generate a single-channel enhanced audio signal, on which voice activity is detected. The multi-channel audio signal is additionally processed by an adaptable noise cancellation filter having variable filter coefficients to generate a noise-suppressed audio signal. The variable filter coefficients are updated during periods of voice inactivity. A speech recognition engine may apply a speech recognition algorithm to the noise-suppressed audio signal and generate an appropriate output. The operation of the speech recognition engine and the adaptable noise cancellation filter may advantageously be controlled based on voice activity detected in the single channel enhanced audio signal from the beamforming network.

DETAILED DESCRIPTION OF THE INVENTION

Figure 1:
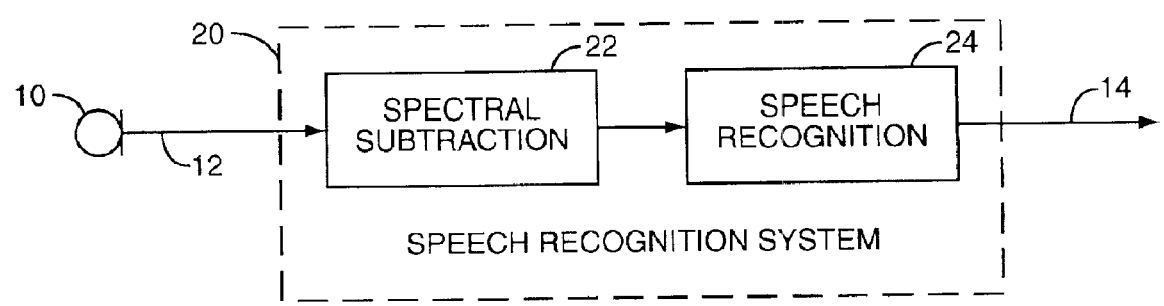
FIG. 1 is a functional block diagram of a prior art single-microphone speech recognition system.

FIG. 1 depicts a block diagram of a typical prior art speech recognition system as used in vehicle-mounted hands-free mobile communications terminals. The system comprises a single microphone 10 and a speech recognition system 20. The speech recognition system 20 comprises, in this example, a spectral subtraction noise reduction operation 22 followed by a speech recognition operation 24. Microphone 10 generates an audio signal 12 that is an input to the speech recognition system 20. The speech recognition system 20 generates commands 14 corresponding to commands spoken by the user into microphone 10. Commands 14 may in general comprise any form of digital or analog output appropriate to effect the desired function in a mobile communications terminal (not shown).

The spectral subtraction noise reduction operation 22 generally exploits differences in the spectral characteristics of speech and noise, to suppress the noise component of audio signal 12. Such systems are described for example in S. F. Boll. "Suppression of acoustic noise in speech using spectral subtraction," IEEE Trans. on Acoustics, Speech, and Signal Processing. ASSP-27(2):113–120, April 1979, and R. J. McAlulay and M. L. Malpass. "Speech enhancement using a soft-decision noise-suppression filter," IEEE Trans. on Acoustics, Speech and Signal Processing, ASSP-28:137–145, 1980.

The speech recognition operation 24 generates commands 14 from the supposedly noise-suppressed audio output of the spectral subtraction operation 22. A wide variety of speech recognition algorithms and techniques are known in the art, and may be advantageously utilized.

A major disadvantage of the single microphone noise reduction approach of the system of FIG. 1 is that high signal processing gain cannot be achieved at low SNR because the noise component of the audio will dominate the speech component. Additionally, artifacts are introduced into the speech component by the spectral subtraction algorithm. As a result, the speech recognition algorithm using a single microphone approach yields low performance in noisy environments. Removing the microphone from adjacent the speaker's mouth, as in a hand-free system, introduces a significant noise into the audio signal. Environmental noise within the passenger compartment of a motor vehicle may comprise a combination of noise from the car engine, windows, tires, exhaust, and the like. These noises combine in single-microphone hands-free systems, significantly reducing the SNR of the speech audio component.

However, each of these disparate sources of environmental noise exhibits different spatial properties. According to the present invention, the spatial properties of the noise sources are exploited to reduce the noise component of the audio signal during pauses in speech activity, to improve speech recognition. To advantageously utilize the spatial properties of noise sources, a microphone antenna array is employed as an audio input transducer, in lieu of the microphone 10 of the system of FIG. 1.

The microphone antenna array reduces the noise component of the audio signal in two ways. First, beamforming techniques are applied to the multi-channel audio signal to boost the SNR of the speech component by concentrating the microphones' sensitivity at the speaker. Voice Activity Detection (VAD) is performed on the enhanced voice signal. Second, an adaptive filter is utilized to selectively suppress the noise component of the multi-channel audio signal. The coefficients of the adaptive filter are updated during pauses in speech, as detected by the enhanced VAD signal, when only noise is present in the audio input. Speech recognition is then performed on the dynamically noise-suppressed audio signal. The speech recognition may occur only during times of voice activity, as detected by the enhanced VAD signal.

Figure 2:
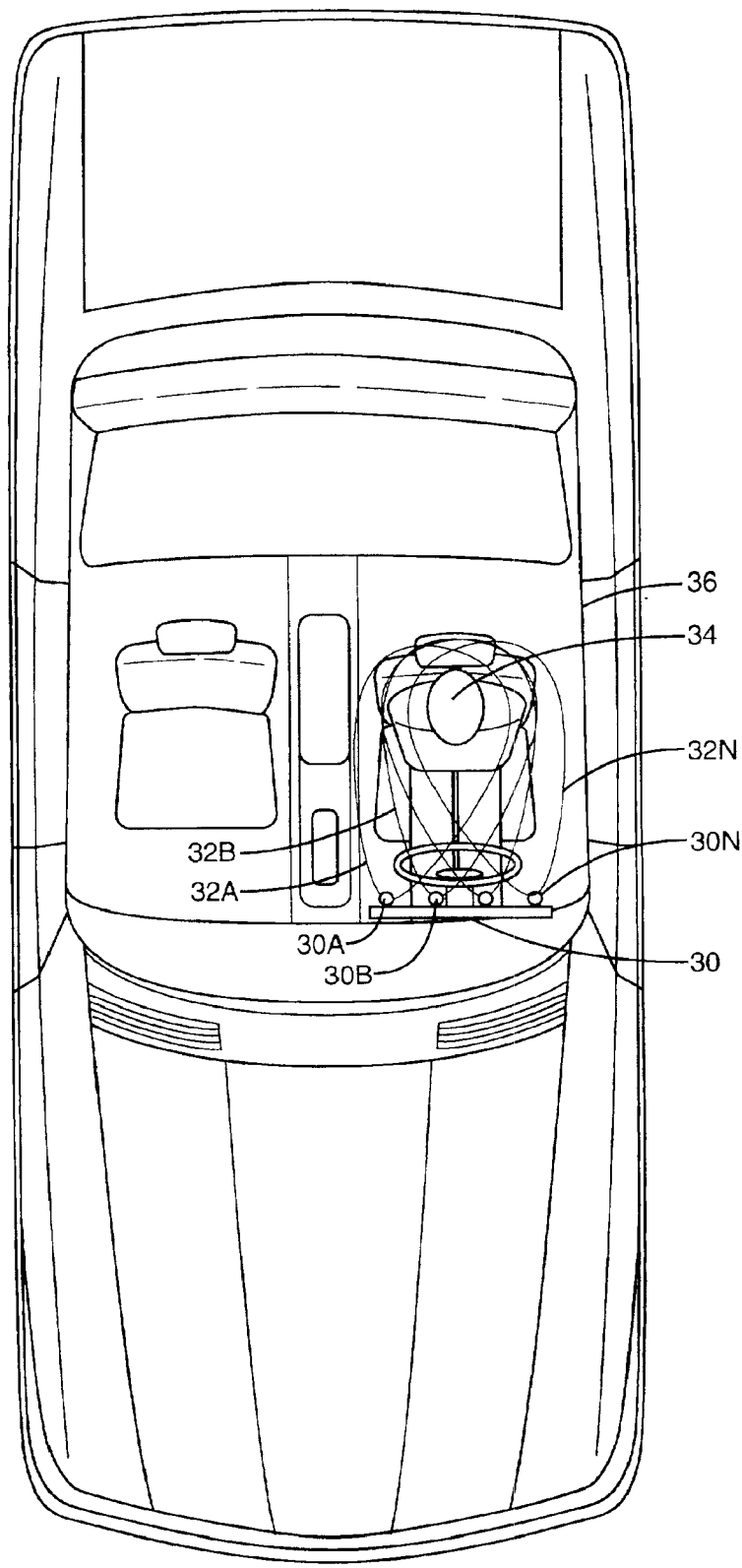
FIG. 2 is a diagram depicting the beamforming effect of a microphone antenna array in the passenger compartment of a motor vehicle.

Selective enhancement or concentration of a physical location or zone within an antenna field through beamforming via phase manipulation is well known in the art. FIG. 2 depicts a representative example of beamforming by a microphone antenna array 30 to concentrate the audio signal of each array element or microphone 30A, 30B, . . . 30N on a speaker (in this example, the driver 34 in a motor vehicle passenger compartment 36). The active field, or beam, 32A, 32B, . . . 30N of each microphone 30A, 30B, . . . 30N, respectively, is effectively targeted or concentrated on the head of the driver 34, as shown. This result is achieved by exploiting the differences in the distance of each microphone 30A, 30B, . . . 30N from the driver 34. By adjusting the phase of the audio signal from each microphone 30A, 30B, . . . 30N and summing the signals, the speech component of the resulting audio signal is coherently added, and thus significantly enhanced with respect to the noise, which is incoherently added.

According to the present invention, the beamformed audio signal from the microphone antenna array 30, with the speech component of the audio having an enhanced SNR, is used to differentiate the speech and non-speech periods of the audio signal. Since the VAD operation is performed on an audio signal with an enhanced speech component SNR, the VAD signal is correspondingly more accurate. This enhanced VAD signal is subsequently utilized by both an adaptive noise cancellation filter and a speech recognition engine to dramatically improve the speech recognition function of audio from a microphone antenna array.

Figure 3:
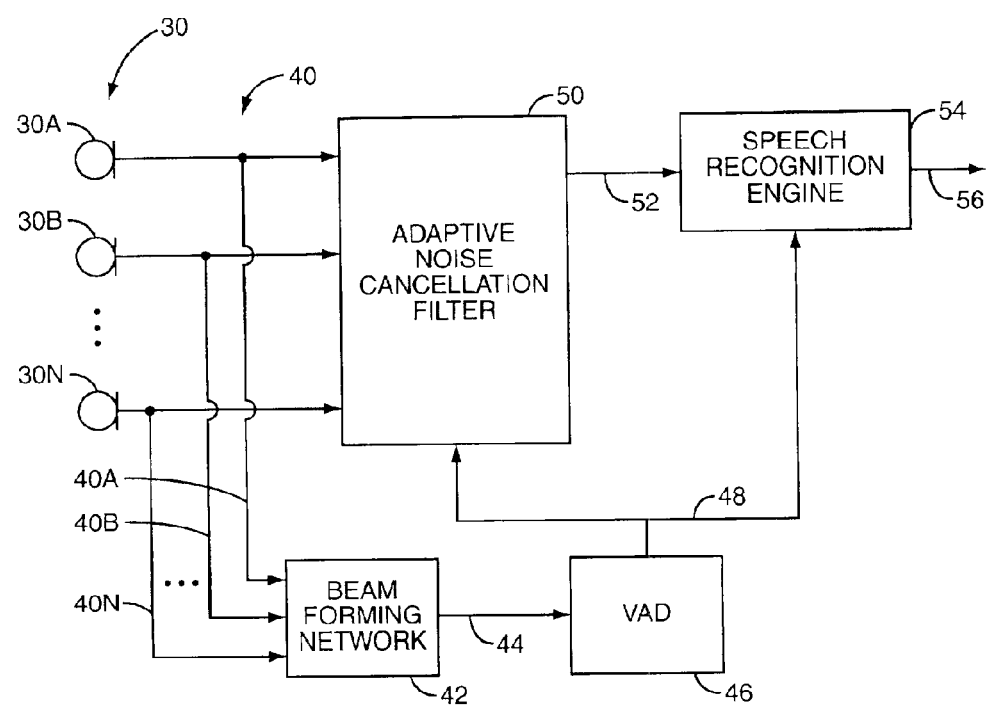
FIG. 3 is a functional block diagram of a multiple-microphone speech recognition system according to one embodiment of the present invention.

A representative block diagram of the speech recognition system of the present invention is depicted in FIG. 3. The system comprises microphone antenna array 30, beamforming network 42, VAD circuit 46, adaptive noise cancellation filter 50, and speech recognition engine 54. Microphones 30A, 30B, . . . 30N of microphone antenna array 30 output multi-channel audio signal 40 comprising audio signals 40A, 40B, . . . 40N, respectively. Those of skill in the art will readily recognize that the audio signals 40A, 40B, . . . 40N may be analog or digital. Similarly, any of the functional blocks of FIG. 3 may be implemented via analog or digital circuits, with appropriate A/D and/or D/A conversion as necessary. Additionally, one or more of the functional blocks may be implemented in software executed on one or more microprocessors, digital signal processors, and/or custom stored-program or hard-wired integrated circuits.

The beamforming network 42 coherently sums the speech component of multi-channel audio signals 40A, 40B, . . . 40N, as described above, generating a single-channel, enhanced audio output 44. Beamforming networks for audio signals are known in the art. A representative beamforming network 42 is described in U.S. Pat. No. 5,353,376, titled "System and Method for Improved Speech Acquisition for Hands-Free Voice Telecommunication in a Noisy Environment," issued to Sang G. Oh, et al., and incorporated herein in its entirety.

The VAD circuit 46 performs voice activation detection on the enhanced audio signal 44. The VAD circuit 46 outputs an enhanced VAD signal 48, representative of voice activity in the multi-channel audio signals 40A, 40B . . . 40N. That is, the enhanced VAD signal 48 is a binary signal indicative of one of two mutually exclusive states: voice or non-voice activity currently present on multi-channel audio signals 40A, 40B, . . . 40N. The enhanced VAD signal 48 is supplied to both the adaptive noise suppression filter 50 and the speech recognition engine 54. Voice Activity Detection on a single channel audio input is well known in the audio processing and communications arts, and VAD circuit 46 may comprise or implement any suitable VAD circuit, algorithm, or program. A representative VAD implementation is described in F. Beritelli, S. Casale, and A. Cavalloro, "A Robust Voice Activity Detector for Wireless Communications Using Soft Computing," IEEE Journal on Selected Areas in Communications, vol.16, pp. 1818–29, Dec. 9, 1998, incorporated herein in its entirety.

As a driver 34 engages in telephonic communications via a wireless mobile terminal, the noise environment within the motor vehicle passenger compartment 36 typically does not remain static. For example, the engine noise may increase and decrease as the driver (or the automatic transmission) shifts gears; the driver or a passenger may open or close a window, altering the audible wind noise; the road surface may change, altering the tire noise; the external whether may change, such as the initiation or cessation of rain; and the like. Thus, ideally the noise suppression in a speech recognition system should be dynamic, i.e., capable of adapting to a changing noise environment by altering the parameters of its noise suppression operation. It is well known that typical human speech contains significant pauses or periods of inactivity. According to the present invention, during these pauses in speech activity, the coefficients of an adaptive noise suppression filter are updated to cancel the then-present noise component of the audio signal.

Adaptive noises suppression filter 50 processes the multi-channel audio input 40 to reduce the noise component, boosting the SNR of the speech component. Since the adaptive noise suppression filter 50 receives the audio signals 40A, 40B, . . . 40N from the microphone antenna array 30, the filter 50 may utilize spatial and temporal, as well as spectral, properties of the noise sources to enhance its suppression of noise in the single-channel enhanced voice audio output 52. Such an adaptive filter is described in U.S. patent application No. 09/515,907, entitled "Methods and Systems for Noise Reduction for Spatially Displaced Signal Sources," assigned to the assignee of the present application, and incorporated herein in its entirety.

According to the present invention, the coefficients of adaptive noise suppression filter 50 are updated during pauses in speech, as indicated by the enhanced VAD signal 48. During these times, the entire audio signal comprises current environmental noise, and the adaptive filter 50 may update its coefficients to effectively eliminate the environmental noise. Since pauses in the speech, while intermittent, are ongoing throughout the duration of the telephonic communication, the noise suppression operation of the adaptive filter 50 tracks the changes in the noise sources throughout the conversation, thus more effectively suppressing the noise.

Speech recognition engine 54 receives the voice-enhanced audio signal 52, and the enhanced VAD signal 48. The speech recognition engine 54 interprets the speech component of the audio signal. In one embodiment of the present invention, either the audio signal or the translated speech is scanned for one or more of a set of predetermined commands. When detected, the commands are output at command output 56, in a format compatible with an attached wireless mobile communications terminal, and are effective to control operations of the mobile terminal, such as dialing a number, terminating an ongoing call, and the like. In one embodiment, the recognized command set is programmable, and a user may, for example, associate a telephone number with a command such as, "Call Home." In one embodiment, the recognized command set is extensible, and the user may add both voice commands to be recognized and the associated operations to be performed on the mobile terminal.

Speech recognition techniques are well known in the art, and the speech recognition engine 54 may comprise or implement any circuit, algorithm, or program as appropriate. For example, a representative speech recognition system is described L. R. Rabiner, "Applications of Speech Recognition in the Area of Telecommunications," IEEE Proceedings, pp. 501–10, 1997; another reference describing speech recognition is L. R. Rabiner and B. H. Juang, "Fundamentals of Speech Recognition," Prentice Hall PTR, Englewood Cliffs, N.J., 1993. Both of these references are incorporated herein in their entirety. In one embodiment of the present invention, the processing workload of the speech recognition engine 54 is reduced, and its accuracy improved, by interpreting speech in the audio signal only during times of voice activity, as indicated by the enhanced VAD signal 48. By interpreting speech only when voice activity is present, the speech recognition engine 54 does not waste processing power attempting to interpret noise as speech. In addition, many speech recognition algorithms are adaptive, in that their accuracy improves as they "learn" the voice characteristics of a particular user. According to the present invention, an adaptive speech recognition algorithm need not attempt to interpret environmental noise as speech, and thus may more accurately and rapidly train itself to a user's voice.

As will be readily apparent to one of ordinary skill in the art, the speech recognition engine 54 may provide additional outputs, not shown in FIG. 3. For example, all recognized speech may be output in a text format, such as to a word processing application on a portable computer, a teletype terminal or similar text-based communications device, or the like. Additionally, other commands may be interpreted and provided at an output compatible with other components or subsystems of the automobile.

The speech recognition system and method of the present invention may be incorporated into a wireless communications system mobile terminal, for example with an input for the microphone array. Alternatively, the speech recognition system and method of the present invention may be incorporated into a hands-free adapter. Such a hands-free adapter may include a microphone array and the audio signal processing and speech recognition circuits described herein. The hands-free adapter may additionally include a speaker. Alternatively, the hands-free adapter may utilize one or more existing speakers in the vehicle, such as for example a vehicle voice information system, or the vehicle radio.

While the present invention has been described herein with reference to a driver and a motor vehicle, the invention is not so limited. As one of skill in the art will readily recognize, the present invention may find utility in a wide range of applications where accurate speech recognition in the presence of spatially distinct environmental noise is necessary or desirable. By way of example and without limitation, the present invention may be advantageously installed in motor vehicles, aircraft, watercraft, agricultural equipment, and heavy machinery. The present invention may additionally find utility as an input device for personal computers, personal digital assistants, cellular radiotelephones, or similar consumer electronics that include a user interface amenable to speech recognition and/or voice command input.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

EXAMPLE

The speech recognition systems of FIGS. 2 and 3 were constructed and tested in an acoustic laboratory. Noise source locations were established to approximate the noise environment in a motor vehicle passenger compartment. Data were collected using both a conventional single microphone system and the microphone array system of the present invention. Both speech recognition systems employed the same speech recognition algorithm. Data were recorded simultaneously from both systems using an A-80 8-channel DAT recorder, for four different Signal-to-Noise Ratios. The results are listed in Table 1 below.

For high SNR (10 dB), both speech recognition systems functioned without error. As the SNR degraded to 5 dB, the conventional single microphone system exhibited a 7% error rate. The microphone array system of the present invention, however, did not exhibit recognition errors until an SNR of −5 dB. The microphone array speech recognition system of the present invention thus exceeds the performance of a conventional single microphone system by approximately 10 dB.

TABLE 1

EXPERIMENTAL RESULTS

| | Single Microphone | | Microphone Array | |
|---|---|---|---|---|
| SNR | Not Recognized | Recognized Correctly | Not Recognized | Recognized Correctly |
| 10 dB | 0 | 100 | 0 | 100 |
| 5 dB | 7 | 93 | 0 | 100 |
| 0 dB | 20 | 80 | 0 | 100 |
| −5 dB | 86 | 14 | 7 | 93 |

What is claimed is:

1. A method of recognizing speech, comprising:
receiving speech input via a plurality of microphones;
processing a corresponding plurality of audio signals from said microphones with a beamforming network to generate a first improved audio signal;
detecting voice activity on said first improved audio signal;
processing said plurality of audio signals from said microphones with an adaptive noise cancellation filter having variable filter coefficients to generate a second improved audio signal;
repeatedly updating said variable filter coefficients during periods of voice inactivity as detected on said first improved audio signal to minimize non-speech audio components in said second improved audio signal; and
performing speech recognition on said second improved audio signal.

2. The method of claim 1, wherein performing speech recognition on said second improved audio signal occurs in response to detecting voice activity on said first improved audio signal.

3. The method of claim 1 wherein said detecting voice activity on said first improved audio signal comprises detecting voice activity on an improved audio signal neither generated by said adaptive noise cancellation filter nor derived from any signal output thereby.

4. A method of speech recognition, comprising:

receiving audio input at a microphone array comprising a plurality of microphones and generating a multi-channel audio signal;

processing said multi-channel audio signal into a first single channel audio signal by a beamforming network;

detecting voice activity in said first single channel audio signal;

processing said multi-channel audio signal into a second single channel audio signal by an adaptable audio filter;

selectively updating parameters associated with said adaptable audio filter;

timing said updating of parameters based on said voice activity detection; and performing speech recognition on said second single channel audio signal.

5. The method of claim 4, further comprising timing said speech recognition based on said voice activity detection.

6. A system for speech recognition, comprising:

a microphone array comprising a plurality of microphones for receiving audio input, said microphone array generating a multi-channel audio signal;

a beamforming network receiving said multi-channel audio signal and generating a first single channel audio signal;

a voice activity detection module receiving said first single channel audio signal and generating a binary signal indicative of the presence or absence of a voice component in said first single channel audio signal;

an adaptive noise cancellation filter having variable filter coefficients receiving said multi-channel audio signal and said binary signal, and generating a second single channel audio signal, said filter coefficients being updated in response to said binary signal;

a speech recognition engine receiving said second single channel audio signal, operative to interpret speech in said second single channel audio signal in response to said binary signal.

7. The system of claim 6, wherein said filter coefficients are updated in response to said binary signal indicating the absence of a voice component in said first single channel audio signal.

8. The system of claim 6, wherein said speech recognition engine additionally receives said binary signal, and interprets speech in said second single channel audio signal in response to said binary signal indicating the presence of a voice component in said first single channel audio signal.

9. The system of claim 6, wherein said beamforming network, said voice activity detection module, said adaptive noise cancellation filter, and said speech recognition engine are included in a wireless communications mobile terminal.

10. The system of claim 6, wherein one or more of said beamforming network, said voice activity detection module, said adaptive noise cancellation filter, and said speech recognition engine are included in a hands-free adapter capable of connecting to a wireless communications mobile terminal.

11. The system of claim 6, wherein one or more of said beamforming network, said voice activity detection module, said adaptive noise cancellation filter, and said speech recognition engine are implemented in software.

* * * * *